United States Patent [19]

Kojima et al.

[11] Patent Number: 5,069,425
[45] Date of Patent: Dec. 3, 1991

[54] VALVE SLEEVE

[75] Inventors: Takao Kojima; Yukimitsu Minamibata, both of Saitama, Japan

[73] Assignee: Jidosha Kiki Co., Ltd., Tokyo, Japan

[21] Appl. No.: 595,091

[22] Filed: Oct. 10, 1990

[30] Foreign Application Priority Data

Oct. 13, 1989 [JP] Japan .................................. 1-267270

[51] Int. Cl.$^5$ ................................................ F15B 9/10
[52] U.S. Cl. .............................. 251/359; 137/625.21; 91/375 A
[58] Field of Search ........................ 91/375 A; 60/384; 137/625.21; 251/359

[56] References Cited

U.S. PATENT DOCUMENTS

| 4,535,519 | 8/1985  | Kajikawa et al. | 26/157.1 R |
| 4,540,024 | 9/1985  | Bacardit        | 137/625.21 |
| 4,558,720 | 12/1985 | Larson et al.   | 137/625.21 |
| 4,577,660 | 3/1986  | Haga et al.     | 137/625.21 |
| 4,624,283 | 11/1986 | Futaba          | 91/375 A   |
| 4,765,369 | 8/1988  | Bacardit        | 137/625.21 |
| 4,779,646 | 10/1988 | Vincent         | 91/375 A   |

FOREIGN PATENT DOCUMENTS

| 49-49541   | 12/1974 | Japan . |            |
| 54-132935  | 10/1979 | Japan . |            |
| 005278     | 4/1984  | Japan   | 137/625.21 |
| 60-157582  | 10/1985 | Japan . |            |

Primary Examiner—A. Michael Chambers
Attorney, Agent, or Firm—Flynn, Thiel, Boutell & Tanis

[57] ABSTRACT

A valve sleeve is fitted around valve rotor to define a rotary valve. The valve sleeve is characterized by the configuration of axially extending grooves which are formed in its internal surface. Specifically, the axial groove has a bottom surface which includes a lengthwise portion having a constant depth. The bottom surface of the groove is connected to the wall surfaces which are located at the opposite lengthwise ends as well as with the opposite lateral side walls by arcuate surfaces. At least one of the wall surfaces which are located at the lengthwise ends has an angle of inclination which exceeds 60°.

4 Claims, 1 Drawing Sheet

VALVE SLEEVE

FIELD OF THE INVENTION

Background of the Invention

The invention relates to a valve sleeve which is fitted around a valve rotor to form a rotary valve.

A hydraulic rotary valve which may be used in a power steering apparatus, for example, comprises a valve rotor having a plurality of axial grooves formed therein and a valve sleeve rotatably fitted around the periphery of the valve rotor and having an internal surface in which axial grooves are formed which are capable of being brought into overlapping relationship with the opposite circumferential sides of the grooves in the valve rotor. A relative rotational displacement between the valve rotor and sleeve controls the supply and drainage of a hydraulic fluid to or from a power cylinder. Grooves in the valve sleeve are formed as blind grooves, namely, recesses are formed in an intermediate section of the sleeve to define the grooves while both of the end sections of the sleeve must be left free from grooves.

Valve sleeves are known in various forms, depending on the techniques which are employed to form axial grooves in their internal surface. For example, (1) a two-piece or three-piece valve sleeve is known in which axial grooves are formed with its lengthwise ends left open, followed by assembling end sealing rings therewith (Japanese Laid-Open Utility Model Application No. 157,582/1985), (2) a one-piece valve sleeve in which grooves are cut by utilizing a locus of a tool which follows an arc of a circle or a similar curve (Japanese Patent Publication No. 49,541/1974 corresponding to U.S. patent application Ser. No. 714,509 filed by A. A. Bishop) and (3) a one-piece valve sleeve in which grooves are cut by a tool such as an end mill (Japanese Laid-Open Patent Application No. 132,935/1979, corresponding to U.S. Pat. No. 4,276,812 assigned to TRW Inc.).

With the first type, the assembly of a separate ring prevents the wall surface and the bottom surface of the groove at its lengthwise ends from being connected together along a curvilinear surface, whereby difficulty is experienced in avoiding a turbulence which is caused by such connection. With the second type, the length of grooves must be increased to secure a flow rate of oil, resulting in an increased size. With the third type, the cross section of the groove is limited to an arc of a circle. If the width of the groove is increased, the depth of the groove must also be increased. The wall thickness for the bottom surface of the groove cannot be secured without increasing the external diameter of the sleeve. For these reasons, conventional valve sleeves suffered from one disadvantage or another.

SUMMARY OF THE INVENTION

Accordingly, it is an object of the invention to provide a valve sleeve in which the volume of grooves can be secured without increasing the size.

It is a second object of the invention to provide a valve sleeve which prevents the occurrence of a turbulence, thereby reducing the sound produced by a flow of a fluid.

DETAILED DESCRIPTION

Figure 1:
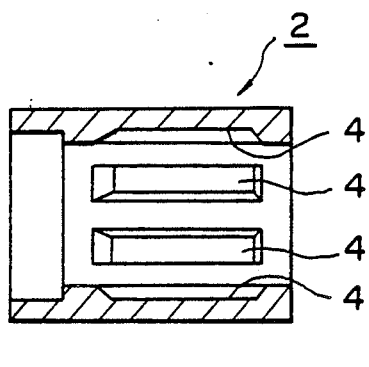
FIG. 1 is a longitudinal section of a valve sleeve according to one embodiment of the invention.
Figure 2:
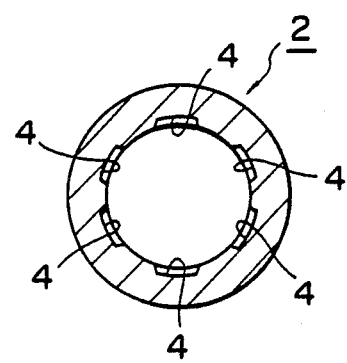
FIG. 2 is a cross section of the valve sleeve shown in FIG. 1.
Figure 3:
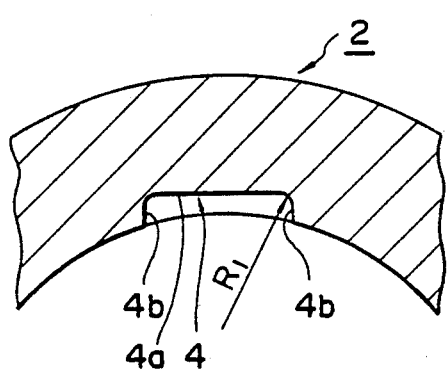
FIG. 3 is an enlarged view of a fragment of FIG. 2.
Figure 4:
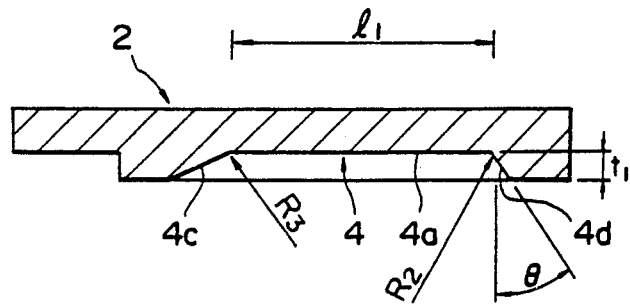
FIG. 4 is an enlarged view of a fragment of FIG. 1.

A valve sleeve according to one embodiment of the invention is shown in longitudinal section in FIG. 1 and in cross section in FIG. 2. A valve sleeve 2 is formed with a plurality of axially extending grooves 4, which are six in the present embodiment, in the internal surface of a cylindrical member. As shown exaggerated in FIGS. 3 and 4, the bottom surface 4a of the axially extending groove 4 is flat (FIG. 3) and the groove has a substantially constant depth $t_1$ over its length $l_1$ (FIG. 4). The lateral side wall 4b of each axial groove 4 rises perpendicular to the bottom surface 4a, and both of the lateral side walls 4b and the bottom surface 4a are connected together by an arc $R_1$ having a radius which is on the order of one-half to two times the depth $t_1$ of the groove.

At its lengthwise ends, each groove 4 has wall surfaces 4c and 4d. The wall surface 4d has an angle of inclination which exceeds 60° ($\theta < 30°$ in FIG. 4), and both of the end walls 4d and 4c are connected with the opposite ends of the bottom surface 4a by arcs $R_2$ and $R_3$, respectively.

With the valve sleeve 2 having axially extending grooves 4 which are configured in the manner mentioned above, a sufficient volume of the grooves 4 can be secured. The grooves 4 have no rectangular portions, so that a smooth flow can be obtained. Accordingly, if the same flow rate is to be flowed as a conventional valve sleeve, it is achieved to reduce the noise of the flow. On the other hand, in accordance with such an effect, if it is allowed to be of the same magnitude of the noise as a conventional valve sleeve, it can be used with a great amount of the flow rate as compared with the conventional art. Further, the length of the grooves 4 can be reduced, or the depth $t_1$ of the grooves 4 may be reduced to decrease the external diameter or the size of the valve sleeve. It will be noted that there is no right-angled portions which give rise to the occurence of the turbulence, nor a restriction which excessively limits the flow rate. Accordingly, the occurrence of sounds which are caused by a flow of a fluid can be prevented or minimized.

Figure 5:
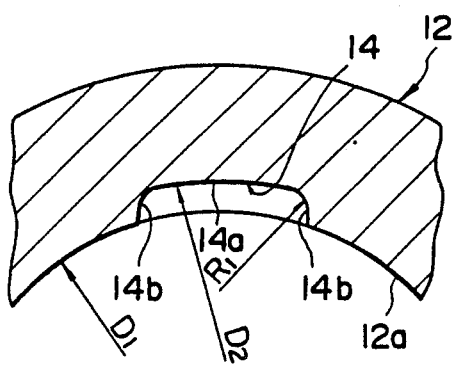
FIG. 5 is a view similar to FIG. 3 illustrating a second embodiment of the invention.

FIG. 5 shows a second embodiment of the invention. In longitudinal section, an axial groove 14 is identical to that of the first embodiment. However, the cross section of a bottom surface 14a represents an arcuate surface or part of a circle which is concentric with an internal surface 12a having a radius $D_2$ which is substantially equal to the radius $D_1$ of the internal surface 12a of a valve sleeve 12. The valve sleeve 12 achieves similar effects as the valve sleeve 2 mentioned above.

It will be noted that in each of the valve sleeves 2 and 12, the opposite ends of the axial grooves 4 and 14 are sealed off by the internal surface of the sleeve itself, and thus represents a one-piece type, dispensing with a separate ring which otherwise would have to be assembled.

Accordingly, the sleeves may be formed by any desired machining operation. By way of example, a plastic machining operation as disclosed in Japanese Laid-Open Patent Application No. 185,539/1984 may be employed to produce groove configurations with a high accuracy and in a facilitated manner.

The embodiments of the invention in which an exclusive property or privilege is claimed are defined as follows:

1. A hollow valve sleeve having a plurality of axially extending grooves formed in an internal surface thereof, said axially extending grooves each having a finite depth and includes a bottom wall, upstanding lateral side walls and opposing wall surfaces closing off opposite ends of said axially extending groove, said valve sleeve being adapted to be fitted around a valve rotor to define a rotary valve, wherein a bottom surface of each axially extending groove has a constant depth over a lengthwise extending zone, the bottom surface of each axially extending groove being connected with the wall surfaces located at each opposite lengthwise end of said axially extending groove by arcuate surfaces, the bottom surface being connected with opposing lateral side walls by further arcuate surfaces having a radius which is in the range of one-half to two times the depth of the groove, at least one of the wall surfaces located at one of the lengthwise ends having an angle of inclination which exceeds 60° relative to the bottom surface.

2. The valve sleeve according to claim 1 in which the bottom surface of the axially extending groove is a flat surface.

3. The valve sleeve according to claim 1 in which the bottom surface of the axially extending groove is in the form of an arc in cross section.

4. The valve sleeve according to claim 3 in which the arc which defines the bottom surface is substantially concentric with the internal surface of the valve sleeve.

* * * * *